July 1, 1952
J. J. WILKES
2,602,115
MILITARY CONVOY CONTROL SIGNAL
Filed April 3, 1951
2 SHEETS—SHEET 1
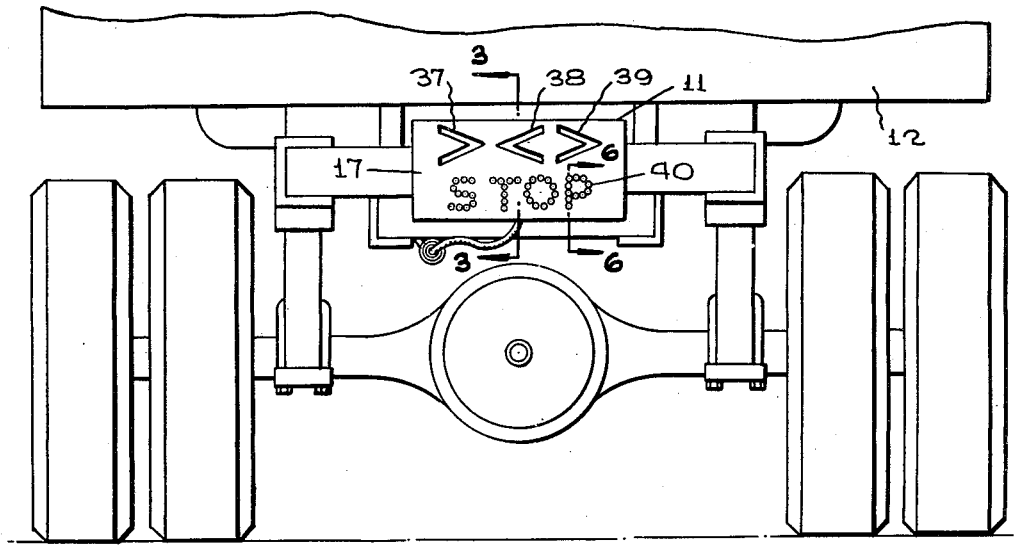
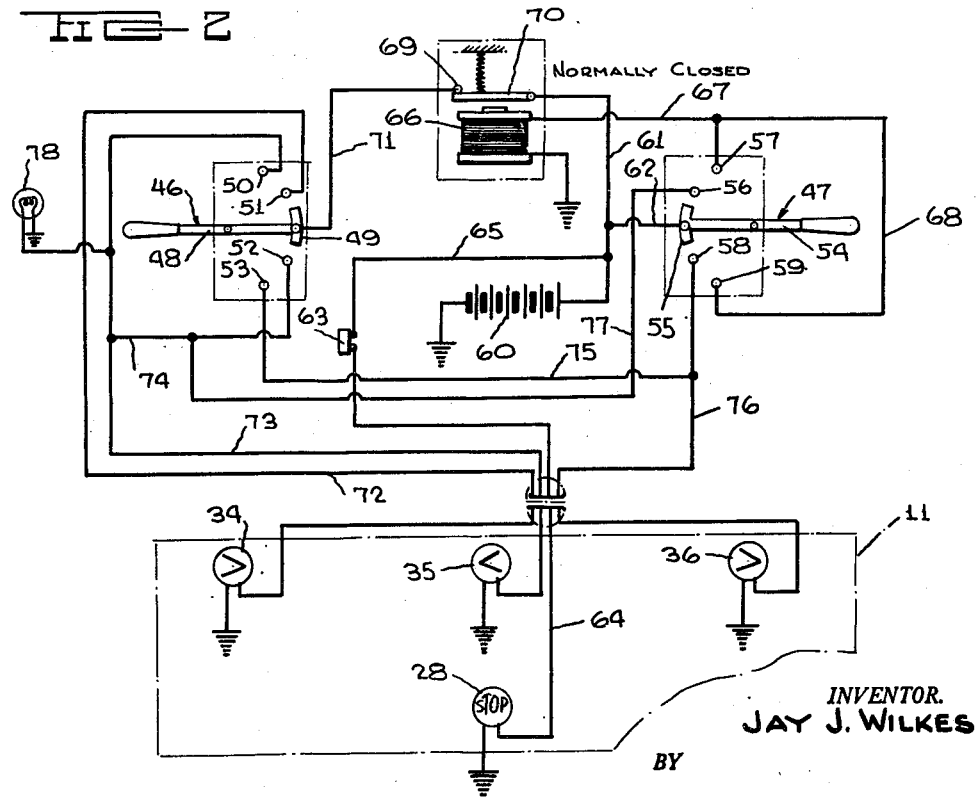
INVENTOR.
JAY J. WILKES
BY
McMorrow, Berman & Davidson
ATTORNEYS July 1, 1952 — J. J. WILKES — 2,602,115
MILITARY CONVOY CONTROL SIGNAL
Filed April 3, 1951 — 2 SHEETS—SHEET 2
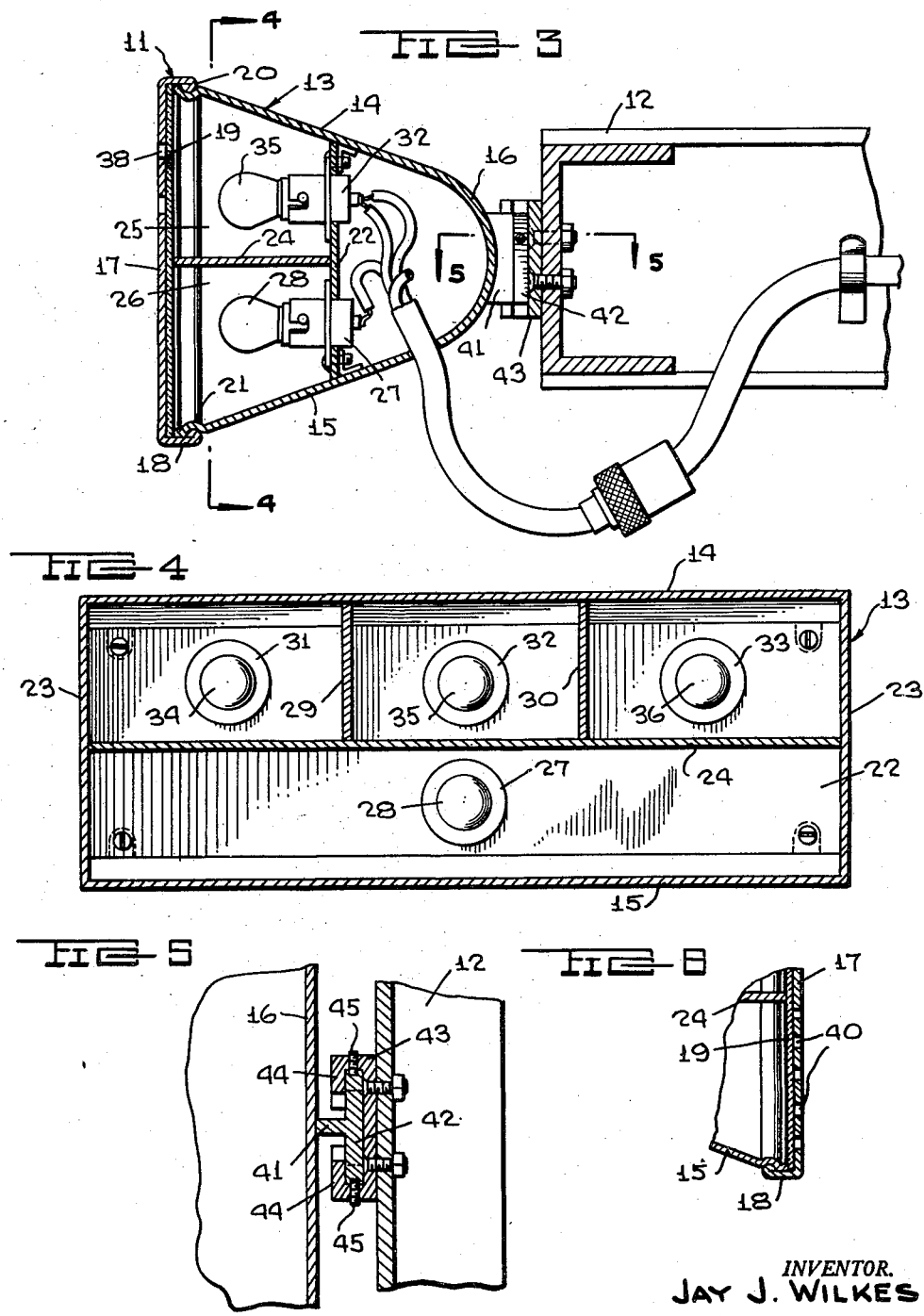
INVENTOR.
JAY J. WILKES
BY
McMorrow, Berman & Davidson
ATTORNEYS Patented July 1, 1952

2,602,115

UNITED STATES PATENT OFFICE 2,602,115

MILITARY CONVOY CONTROL SIGNAL

Jay J. Wilkes, Redondo Beach, Calif.

Application April 3, 1951, Serial No. 218,987

1 Claim. (Cl. 177—329)

This invention relates to signaling apparatus for motor vehicles, and more particularly to a signaling device for use on military vehicles to provide indications as to the interval between the vehicles in a convoy, as to direction of turn and other information to a vehicle behind the vehicle provided with the signaling device.

A main object of the invention is to provide a novel and improved directional and control signaling device for use on vehicles, particularly on military vehicles, said device being arranged to provide various different signals, such as convoy interval signals, stop signals, directional signals and other signals, the signaling device involving relatively simple parts, being easy to install, and providing a means of transmitting definite information from the vehicle on which the signaling device is mounted to a vehicle behind the first-mentioned vehicle.

A further object of the invention is to provide an improved electrical signaling device for use on motor vehicles, which is inexpensive to fabricate, which requires a minimum amount of maintenance, and which provides a plurality of different signals employing the same set of indicators.

Further objects and advantages of the invention will become apparent from the following description and claims, and from the accompanying drawings, wherein:

Figure 1 is a fragmentary rear view of a motor truck provided with an improved signal device constructed in accordance with the present invention;

Figure 2 is a schematic wiring diagram of a signaling device according to the present invention;

Figure 3 is an enlarged cross-sectional view taken on line 3—3 of Figure 1;

Figure 4 is a cross-sectional view taken on line 4—4 of Figure 3;

Figure 5 is a cross-sectional detail view taken on line 5—5 of Figure 3;

Figure 6 is an enlarged cross-sectional detail view taken on line 6—6 of Figure 1.

Referring to the drawings, the signal device comprises a generally rectangular housing 11 adapted to be mounted on the rear portion of the frame of a vehicle 12, as shown in Figure 1, the housing comprising a main body 13 having rearwardly tapering top and bottom walls 14 and 15 integral with the arcuately curved rear wall 16, as shown in Figure 3. Designated at 17 is the front wall of the housing, said front wall having peripheral flanges 18 adapted to grippingly engage the forward marginal portions of the walls of the housing body 13 in the manner shown in Figure 3, a transparent face plate or panel 19 being interposed between and clamped between front wall 17 and the edges of the walls of the main housing body 13. As shown in Figure 3, the flanges 18 may be formed with beads 20 which lockingly engage in the channels 21 formed around the margins of the walls of the housing body 13.

Secured in the housing body 13 parallel to the front wall 17 is a partition wall 22, and secured to the partition wall 22 and to the side walls 23, 23 of the housing is a horizontal partition wall 24 located substantially midway between the top and bottom walls 14 and 15 and dividing the lower portion of the housing into two compartments designated at 25 and 26. Secured to the lower portion of the partition wall 22 is a lamp socket 27 in which is mounted a lamp 28. Designated at 29 and 30 are respective vertical partition elements secured in the upper compartment 25 and dividing said upper compartment into three sections or first, second and third compartments arranged in side by side relation. Secured to the vertical partition wall 22 in the respective sections are the respective lamp sockets 31, 32 and 33 in which are mounted the lamps 34, 35 and 36, as shown in Figure 4. The upper portion of the face plate 19 is cut out to define respective V-shaped slots shown at 37, 38 and 39, the slot 37 being located opposite the lamp 34, the slot 38 being located opposite the center lamp 35, and the slot 39 being located opposite the lamp 36. The lower portion of the front wall 17 is perforated in the manner shown in Figures 1 and 6, the perforations, designated at 40, being arranged to spell out the word "Stop," as shown in Figure 1, the perforated word being illuminated responsive to the energization of the lamp 28. Similarly, each of the V-shaped slots 37, 38 and 39, will be illuminated responsive to the energization of the respective lamps 34, 35 and 36. As shown in Figure 1, the V-shaped slots 37 and 38 are directed inwardly toward each other, and the V-shaped slot 39 points outwardly, the wide end of slot 39 being located adjacent the wide end of the slot 38.

Rigidly secured to the rear wall 16 of the housing body 13 is a vertical T-shaped bracket member 41 having the head portion 42 which is receivable in a vertical channel member 43 secured to the rear end of the frame of the motor truck 12, the channel member 43 having inturned flange elements 44, 44 engaging around the edges of the head 42, and the flanges of said channel member being provided with set screws 45 clampingly engaging the edges of the head 42, as shown in Figure 5. The head 42 is formed with downwardly convergent side edges, and the channel member 43 is formed with downwardly convergent side margins, whereby the flanges of said channel member define a downwardly convergent socket receiving the head 42 and securely supporting the signal housing 11.

Referring now to Figure 2, 46 and 47 designate a pair of three-position switches mounted on the steering post of the vehicle or mounted in any other suitable positions conveniently located within reach of the driver of the vehicle. Switch 46 comprises a pivoted switch blade 48 having a contact portion 49 arranged to bridgingly engage either a first set of stationary contacts 50 and 51 in one rotated position of the blade 48, or a second set of contacts 52 and 53 in an opposite rotated position of said switch blade. In its neutral position, shown in Figure 2, the switch blade is out of contact with either of the aforementioned pairs of contacts 50, 51 or 52, 53. When rotated to its first position, the contact member 49 bridges the contacts 50 and 51, and rotated to its second position above mentioned, the contact member 49 bridges the contacts 52 and 53.

The switch 47 comprises a pivoted switch blade 54 having a contact element 55 adapted to bridgingly engage a third set of fixed contacts 56 and 57 in a first rotated position of the switch blade, and to bridgingly engage a fourth set of fixed contacts 58 and 59 in a second rotated position of the switch blade. In its neutral position, shown in Figure 2, the blade 54 is out of contact with the above-mentioned stationary contacts 56, 57, 58 and 59. When the switch blade 54 is rotated clockwise, as viewed in Figure 2, to its first rotated position, above described, the contact element 55 bridges the fixed contacts 56 and 57, and when the switch blade 54 is rotated counterclockwise, as viewed in Figure 2, to its second above-mentioned rotated position, the element 55 bridges the fixed contacts 58 and 59.

The vehicle battery is designated at 60, the negative pole of the battery being grounded, and the positive pole of the battery being connected to a wire 61. Switch blade 54 is connected to wire 61 by a flexible wire 62. The stop lamp 28 is connected to the wire 61 through a conventional brake-operated stop switch 63, and wires 64 and 65, as shown, the stop lamp 28 becoming energized responsive to the application of the brakes in the conventional manner.

Designated at 66 is a relay coil having one terminal grounded and having its other terminal connected by a wire 67 to the switch contact 57. Contact 57 is connected to contact 59 by a wire 68. Relay coil 66 is provided with the normally closed contact elements 69 and 70, the element 70 being the armature of the relay coil, and the contact 69 being the stationary contact normally engaged by said armature. Wire 61 is connected to armature 70, and contact 69 is connected by a flexible wire 71 to the switch blade 48.

As shown in Figure 2, one terminal of each of the lamps 34, 35, 36 and 28 is grounded. The ungrounded terminal of lamp 34 is connected by a wire 72 to stationary contact 51 of switch 46. The ungrounded terminal of lamp 35 is connected by a wire 73 to the contact 50. Contact 52 is connected by a wire 74 to wire 73, and contact 53 is connected by a wire 75 to a wire 76 connecting contact 58 of switch 47 to the ungrounded terminal of lamp 36. The contact 56 of switch 47 is connected by a wire 77 to the wire 74.

The switch 47 is employed to provide direction signals by selectively energizing either the lamp 35, to indicate a left turn, or the lamp 36, to indicate a right turn. When the blade 54 is rotated clockwise, as viewed in Figure 2, to bridge the contacts 56 and 57, an energizing circuit is established for lamp 35 comprising battery 60, wire 61, wire 62, contact element 55, contact 56, wire 77, wire 74, wire 73, the filament of lamp 35, and ground. When the blade 54 is rotated counterclockwise to a position wherein the element 55 bridges the contacts 58 and 59, an energizing circuit for the lamp 36 is provided comprising battery 60, wire 61, wire 62, contact element 55, contact 58, wire 76, the filament of lamp 36, and ground. Lamp 35 and lamp 36 may therefore be selectively energized by rotating the switch blade 54 either in a counterclockwise or clockwise direction, as above described. It will be noted that in either of the rotated positions of blade 54, the solenoid coil 66 becomes energized by the engagement of the contact element 55 with either of the contacts 57 or 59, the contact element 55 being connected to the positive pole of the battery 60. This, of course, retracts the armature 70 and disengages it from contact 69. It will therefore be apparent that when the switch blade 54 is operated to either of its above-described rotated positions, the circuit to the switch blade 48 is opened by the opening of the contacts 69 and 70 of the relay coil 66.

Assuming the switch blade 54 to be in its neutral position, shown in Figure 2, the operation of the switch 46 is as follows: When the switch blade 48 is rotated in a counterclockwise direction, as viewed in Figure 2, to bring the contact element 49 into bridging engagement with the contacts 50 and 51, the lamps 34 and 35 simultaneously become energized. The energizing circuit for the lamp 34 comprises the battery 60, the wire 61, the armature 70, the contact 69, the wire 71, the contact element 51, the wire 72, the filament of lamp 34, and ground. The energizing circuit for the lamp 35 comprises the battery 60, the wire 61, armature 70, contact 69, wire 71, contact element 49, contact 50, wire 73, the filament of lamp 35, and ground. When the lamps 34 and 35 are simultaneously energized, the V-shaped slots 37 and 38 become illuminated, providing a "Close-up" signal. This notifies the driver of the vehicle immediately to the rear of the signaling vehicle to shorten the spacing between the two vehicles.

Lamps 35 and 36 are energized simultaneously when the switch blade 48 is rotated in a clockwise direction, as viewed in Figure 2, to bring the contact element 49 into bridging contact with contact elements 52 and 53. The energizing circuit for lamp 35 comprises battery 60, wire 61, armature 70, contact 69, wire 71, contact element 49, contact 52, wire 74, wire 73, the filament of lamp 35, and ground. The energizing circuit for lamp 36 comprises battery 60, wire 61, armature 70, contact 59, wire 71, contact element 49, contact 53, wire 75, wire 76, the filament of lamp 36, and ground. The simultaneous energization of lamps 35 and 36 causes the slots 38 and 39 to be simultaneously illuminated, providing the "Open-up" signal, indicating to the driver to the rear of the signaling vehicle that the spacing between the vehicles is to be increased.

As above explained, when the switch 47 is operated to give a directional signal, the circuits associated with the switch 46 are opened by the energization of relay coil 66, whereby no other signals may be given at the same time as the directional signals are given, and thereby avoiding confusion between signals. It will be further noted that in order to give the "Close-up" or "Open-up" signals, the switch blade 54 of the switch 47 must be in the neutral position.

Suitable indicator lamps may be connected in parallel with the respective lamps 35 and mounted on the vehicle dashboard to indicate the energization of any of said lamps, as for example, a signal lamp 78 which is shown connected between the wire 73 and ground, and which becomes energized simultaneously with the energization of the lamp 35. Similar signal lamps may be connected in parallel with the other lamps 34, 36 and 28, the signal lamps being mounted on the vehicle dashboard to indicate the energization of their associated indicators.

The switches 46 and 47 may be similar to those conventionally employed in private automobiles for the purpose of indicating turns. The switches 46 and 47 are preferably mounted on each side of the steering column of the motor truck just below the steering wheel with the operating lever of the lamp available to the fingers of the driver.

If so desired, suitable flasher units may be incorporated in the circuits of the respective lamps 34, 35 and 36, to provide a blinking effect when the lamps are illuminated, so as to attract the attention of the driver in the following vehicle.

While a specific embodiment of an improved motor vehicle signaling apparatus has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a vehicle rear signal, a housing having first second and third compartments arranged in side by side relation and open at their fronts, a face plate covering the open fronts of said compartments and bearing first second and third V-shaped slots arranged in horizontal spaced aligned relation, said first second and third slots overlying said first second and third compartments respectively, the first and second slots pointing toward each other and the second and third slots pointing away from each other, an electric lamp in each of said first second and third compartments, a first electric circuit including a first set of stationary contacts and the lamps in the first and second compartments, a second set of stationary contacts and the lamps in the second and third compartments, and a first switch arm in said circuit and movable in one direction into engagement with said first set of contacts for simultaneously illuminating the lamps in said first and second compartments and movable in the opposite direction into engagement with said second set of contacts for simultaneously illuminating the lamps in said second and third compartments, and a second electric circuit including a relay having normally closed contacts in series with said first circuit, said second circuit including a third set of stationary contacts and the lamp in the second compartment and the relay, a fourth set of stationary contacts and the lamp in the third compartment and the relay, and a second switch arm movable in one direction into engagement with said third set of contacts for illuminating the lamp in said second compartment and movable in the opposite direction into engagement with said fourth set of contacts for illuminating the lamp in said third compartment.

JAY J. WILKES.

REFERENCES CITED

The following references are of record in the file of this patent:

UNITED STATES PATENTS

| Number | Name | Date |
| --- | --- | --- |
| 1,325,831 | Carr et al. | Dec. 23, 1919 |
| 1,502,370 | Bullard | July 22, 1924 |
| 1,688,803 | Dailey et al. | Oct. 23, 1928 |
| 2,330,561 | Dietrich | Sept. 28, 1943 |